United States Patent
Hayes et al.

(10) Patent No.: US 7,272,158 B1
(45) Date of Patent: Sep. 18, 2007

(54) HIGHLY EFFICIENT WAVEGUIDE PULSED THZ ELECTROMAGNETIC RADIATION SOURCE AND GROUP-MATCHED WAVEGUIDE THZ ELECTROMAGNETIC RADIATION SOURCE

(75) Inventors: Robert R. Hayes, Calabasas, CA (US); Stanislav Ionov, deceased, late of Calabasas, CA (US); by Irina V. Ionova, legal representative, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 11/355,245

(22) Filed: Feb. 14, 2006

Related U.S. Application Data

(60) Provisional application No. 60/653,568, filed on Feb. 15, 2005.

(51) Int. Cl.
*H01S 3/10* (2006.01)
*G02B 6/02* (2006.01)

(52) U.S. Cl. ............................. 372/21; 372/4; 385/125
(58) Field of Classification Search ................... 372/6, 372/7, 10, 21, 4; 385/122, 123, 125
See application file for complete search history.

(56) References Cited

U.S. PATENT DOCUMENTS

| | | | | |
|---|---|---|---|---|
| 5,475,526 | A * | 12/1995 | Byer et al. | 359/330 |
| 5,999,548 | A * | 12/1999 | Mori et al. | 372/22 |
| 6,144,679 | A * | 11/2000 | Herman et al. | 372/21 |
| 7,054,339 | B1 * | 5/2006 | Hu et al. | 372/12 |
| 2005/0242287 | A1 * | 11/2005 | Hakimi | 250/363.09 |

OTHER PUBLICATIONS

Shi, W., et al., "Designs of terahertz waveguides for efficient parametric terahurtz generation", Applied Physics Letters, vol. 82, No. 25, pp. 4435-4437 (Jun. 23, 2005).

* cited by examiner

*Primary Examiner*—Hemang Sanghavi
(74) *Attorney, Agent, or Firm*—Ladas & Parry

(57) ABSTRACT

Electromagnetic radiation sources operating in the Terahertz (THz) region capable of overcoming the Manley-Rowe limits of known optical schemes by achieving phase matching between a THz wave and optical pulse in a nonlinear waveguide, or by achieving both phase and group velocity matching between a THz wave and optical pulse in a nonlinear waveguide to yield even higher efficiencies in converting optical power to the THz region.

7 Claims, 4 Drawing Sheets

HIGHLY EFFICIENT WAVEGUIDE PULSED THZ ELECTROMAGNETIC RADIATION SOURCE AND GROUP-MATCHED WAVEGUIDE THZ ELECTROMAGNETIC RADIATION SOURCE

CROSS REFERENCE TO A RELATED APPLICATION

This application is related to and claims the benefit of U.S. Provisional Application No. 60/653,568 filed 15 Feb. 2005, the disclosure of which is hereby incorporated herein by reference.

TECHNICAL FIELD

This disclosure relates to electromagnetic radiation sources operating in the Terahertz (THz) region. In particular, the present disclosure relates to a design for a highly efficient THz source based on nonlinear optical pulse rectification in a waveguide that is capable of overcoming the Manley-Rowe limits of other optical schemes by achieving phase matching between a THz wave and optical pulse in a nonlinear waveguide. The present disclosure is further related to a scheme that achieves both phase and group velocity matching between a THz wave and optical pulse in a nonlinear waveguide to yield even higher efficiencies in converting optical power to the THz region.

BACKGROUND OF THE DISCLOSURE

The methods of generating electromagnetic radiation in the THz domain may be subdivided into three broad categories: radiation of fast moving electrons, microelectronic devices and optical techniques.

The first category includes synchrotron radiation, including free electron lasers and backward-wave tubes. The most versatile source of THz radiation is undoubtedly a free electron laser (FEL). Such a laser makes relativistic electrons oscillate between the poles of carefully positioned magnets, which generate tunable, coherent and high power radiation. The radiation wavelength is determined by the magnet period and electron energy. FELs require enormous resources, space and a dedicated staff to run the facilities. The cost, weight and size of a FEL are prohibitive.

The source of the THz emissions from backward-wave tubes is the spiraling motion of bunched electrons in strong magnetic fields. Backward wave tubes generate narrow-band, tunable radiation with average powers ~1 mW. Operation of such a source requires a strong magnetic field and a very high voltage power supply, making it cumbersome and inefficient.

The second category, namely, electronic techniques of generating THz radiation are very attractive because of their promise of device integration and miniaturization; however, the speed limitations of the current microelectronics prohibit a practical transistor circuit from oscillating in the desired frequency range, i.e., above 0.557 THz. So far, the most practical and therefore most widely used way of reaching THz range is by multiplying the frequency of microwave oscillators using nonlinear devices such as diodes. Chains of lower order multipliers (lower than fourth order) are considered efficient THz sources. Though reported output powers are improving continuously, they are still quite low, ca. 0.1 mW at 1 THz, and drop quickly at higher frequencies.

The third category of optical approaches include THz lasers, various photoconductive emitters and nonlinear optical techniques. IR-pumped gas lasers are commercially available from Coherent Inc., DEOS, Edinberg Instruments, and MPE Technologies. Grating-tuned $CO_2$ lasers pump low-pressure, flowing-gas cavities to produce THz waves. Though the output powers of THz gas lasers reach 100 mW, they are very bulky and power-inefficient.

Another type of THz laser is the Quantum Cascade Laser (QCL), a semiconductor device that operates on inter-sub-band transitions. When an electric current flows through the multiple layer structure of a QCL, electrons cascade down the energy staircase of inter-sub-bands and emit a photon at each step. These lasers emit narrow-band tunable radiation with ~1 mW of average power. However, the operation of QCLs requires cryogenic equipment to keep the device at liquid He temperatures. Room temperature QCLs are deemed unlikely.

Photoconductive techniques rely either on mixing optical fields on low-temperature GaAs or on generating photocurrents in switches connected to various antenna structures. The efficiency of such devices at high frequencies is limited by low optical damage thresholds of inherently absorbing semiconductor materials and by the fundamental limitations arising from carrier lifetime/carrier collection efficiencies. Typically, photoconductive devices operate at sub-mW power levels and with conversion efficiencies of ~$10^{-4}$. It might be possible to combine a very large number of photoconductive emitters and thereby reach desirable power levels. Such a brute-force approach, however, requires phase-matching of individual emitters, which further complicates the design and, therefore, increases the technical complexity while reducing the overall efficiency and robustness of the resulting system.

Nonlinear optical techniques include short pulse rectification, difference frequency generation in phase-matched or quasi-phase-matched (QPM) materials and optical parametric oscillation (OPO). Pulse rectification occurs when a pulse propagates in a nonlinear crystal with a nonzero second-order nonlinear susceptibility, thus producing a traveling dipole that generates a single-cycle electric field resembling the first derivative of the optical pulse. The efficiency of the process is greatly increased when the generated THz field is phase-matched to the group velocity of the optical pulse. This is achieved either in a birefringent crystal, e.g., ZnTe, or by tilting the energy front of the optical pulse.

Coherent and tunable THz radiation can be produced by mixing two wavelength-offset optical frequencies in a phase-matched nonlinear material. This technique produced the highest conversion efficiency from the near IR to THz, reaching 0.024% at 1.53 THz according to W. Shi, Y. J. Ding and N. Fernelius "Improvement on Tuning Ranges and Output Powers by Means of Phase-Matches Difference-Frequency Generation in Zinc Germanium Phosphide" Appl. Phys. Lett., v. 83, 848 (2004). A modification of this technique is THz generation in a parametric oscillator. All these approaches rely on birefringence of nonlinear materials to achieve phase-matching between the near IR pump and seed waves and the THz radiation. The phase matching requirements limit the choice of available materials down to just a few, most notable examples of those being GaSe, $LiNbO_3$, and $ZnGeP_2$. Recently, a THz waveguiding technique has been proposed that tunes the phase velocity of the THz guiding wave to that of the optical beam without relying on material birefringence. This approach broadens the choice of material for THz generation. Yet another techniques that achieves relatively efficient conversion from near IR to THz is quasi phase matching in periodically-poled lithium niobate or in diffusion bonded GaAs and GaP.

It has been already mentioned that short pulse excitation techniques produce broadband THz waveforms that resemble the first derivative of the optical pulse shape, whereas CW and long pulse (quasi CW) excitation produces nearly monochromatic radiation. There is, however, a short-pulse excitation technique that generates long slices of THz sine waves. It is optical pulse rectification in Periodically Poled Lithium Niobates (PPLNs). When a short optical pulse propagates through a crystal with inverted ferroelectric domains, it creates electric fields directed in the opposite directions. Since THz and optical propagation speeds differ significantly, these fields add up into a THz waveform whose shape mimics the domain structure of the crystal. This technique not only allows generation of arbitrarily-shaped waveform, but also allows one to map the domain structure of the crystal with sub-micron resolution.

It is also important to emphasize that a nonlinear dipole propagating through a PPLN structure emits THz radiation in all directions, and that the observed THz frequency depends on the observation angle. Therefore, one may design the domain structure of PPLN for generating THz radiation with a particular frequency in the direction normal to the direction of the optical pulse. Since the cross section of the PPLN does not have to be much larger than the size of the optical beam, the side-emitted THz traverses only a short length of the crystal before exiting into the free space, thus reducing significantly the absorption due to the dielectric losses in the material.

TABLE I

Characteristics of nonlinear optical THz

| Excitation Scheme | THz Spectrum | THz Directionality | Conversion Efficiency Limit |
|---|---|---|---|
| Long-Pulse (quasi-cw) DFG and OPO | Narrowband | Highly directional | Manely-Rowe, ~1% |
| Short pulse rectification | Broadband | May be directional if phase-matched | 100% |
| Short pulse in PPLN | Narrowband in a particular direction | Non-directional | 100% |

Table I lists the characteristics of various nonlinear optical techniques of generating THz radiation. Long pulse (quasi CW), difference frequency generation (DFG) and OPO produce highly directional, narrowband radiation, and its demonstrated conversion efficiency approaches 5% quantum efficiency. This scheme, however has one fatal flaw—it cannot overcome the Manely-Rowe limit. At 100% quantum conversion efficiency, when all the high frequency photons of the pump are converted to signal and THz photons, the power conversion efficiency is under 1% because of the large difference in the THz and opticalnear IR frequencies. The Manely-Rowe limitation may be overridden with a cascading scheme, where the longer wavelength photons of the pump begin generating THz before the shorter wavelength photons are completely consumed by in the process of difference frequency generation (DFG). Such cascading schemes have been realized in Raman scattering of visible and near IR light at very high intensities that exceed significantly the intensity required for 100% conversion to the first Stokes wavelength. It is believed that no such schemes have been ever developed and demonstrated for THz generation.

Short optical pulses may in principle provide higher conversion efficiency, since the latter is proportional to the peak power of the pulse in the nonlinear schemes. It is true that the peak intensity of an optical pulse can only be increased up to the damage threshold of the nonlinear material. However, short optical pulses are advantageous over long ones from this perspective, since the damage threshold of transparent materials (in Watt/cm$^2$) falls off for shorter pulses, until it scales with energy density for durations of 1 ps and less. Moreover, short pulse excitation schemes in principle are not limited by the Manely-Rowe restriction, because such pulses have sufficient spectral width for DFG within their bandwidth. As THz radiation consumes more and more power on the blue side of the pulse spectrum, the spectrum rolls to the red, which is similar to Raman red shifts observed for short optical pulses in fibers. This process may continue until most of the optical energy is converted to a THz wave, subject to significant degradation of the pulse shape due to dispersion.

Short pulse THz generating schemes, however, have other significant flaws. They produce broadband radiation, which is very hard to collect with high efficiency and utilize at the target.

What is needed is a method and apparatus for THz electromagnetic radiation generation that offers the best features of the above-described schemes, while not suffering from their drawbacks. The embodiments of the present disclosure answer these and other needs.

BACKGROUND AND SUMMARY OF THE DISCLOSED EMBODIMENTS

In a first embodiment disclosed herein, a THz electromagnetic radiation source has phase matching.

In another embodiment disclosed herein, a THz electromagnetic radiation source has phase and group velocity matching.

The use of optical rectification to generate Terahertz radiation in certain nonlinear materials is a well-know and relatively well-understood phenomenon in the prior art. The mechanism, often referred to as optical rectification, can be explained as follows. An optical field induces a nonlinear polarization P, in the material that is proportional to the local intensity of the optical field. If the envelope of the field is a pulse, moving in a particular direction, then the induced polarization is also a pulse, having the shape and velocity of the optical intensity pulse. In a medium in which the group velocity of the optical and Terahertz waves are the same, the forward-motion of this dipole "grows" a field that has the shape of the derivative of the optical pulse. This derivative pulse is essentially a single cycle of electromagnetic radiation.

Efficient growth of this pulse only occurs when the Terahertz and optical group velocities are matched. When they are not, and when the velocity of the Terahertz wave is slower than the optical wave (which is almost always the case), one forms a bow-wave of lower-power single-cycle Cherenkov radiation.

Achieving the group velocity match needed for efficient Terahertz generation can be difficult. Materials having a large nonlinear coefficient for optical rectification often have an index of refraction at Terahertz frequencies that is substantially larger than that at optical frequencies. The index for LiNbO$_3$, for example, is 2.2 at optical wavelengths, but 5.3 to 6.6 at Terahertz radiation frequencies, depending on field orientation (the material is anisotropic). Thus, the Terahertz wave in this material has a velocity that is roughly one-third that of the optical wave.

Not all materials have this problem. Certain nonlinear polymers have indices of refraction that are comparable at Terahertz and optical frequencies. There are also covalent semiconductors with relatively large nonlinear coefficients that have indices that differ by only 10-20% at the two frequency ranges. However, only in the most serendipitous cases does one find a material in which the phase and group velocities are exactly equal to each other over the entire THz spectrum of the pulse. Thus, for most materials one must use some external means to force a match.

There are several ways to do this for the moving dipole approach disclosed herein. One is to artificially vary the properties of the material so that one achieves a phase velocity match (see the second embodiment discussed below). This can be done in $LiNbO_3$ by periodically inverting the Ferroelectric domains, a process known as poling. Poling forms regions in which the sign of the nonlinear coefficient can be set to be either positive or negative. When an optical pulse moves through material that has been periodically poled, it forms a local dipole moment that flips direction as it moves from one domain to the next. Thus, to an external observer, the dipole appears to be oscillating as it moves forward. See FIG. 1. The radiation field is that of an oscillating dipole, moving forward with a velocity $c/n_e$, where $n_e$ is the optical index of refraction of the material. Because of Doppler shifts, the observed radiation frequency depends upon the direction of radiation. However, for an observer looking perpendicular to the direction of propagation, that frequency is unshifted and is just the number of domains the pulse propagates through per second, divided by two.

This particular approach has several advantages. The most important is that it greatly mitigates the effects of Terahertz absorption for radiation leaving through the side of the crystal. By simply making the lateral dimensions of the crystal just slightly larger than the beam size, one greatly reduces the distance the Terahertz radiation must travel in the absorbing crystal. This is a tremendous benefit for $LiNbO_3$, which has a significant room-temperature absorption coefficient (~90 $cm^{-1}$) at 3 THz. Other advantages are simplicity and ease of fabrication.

Another approach for dealing with velocity mismatch is to incorporate the nonlinear material in a waveguiding structure, and to use the dispersion of the waveguide to adjust the phase velocity of the THz wave in the structure to the group velocity of a short optical pulse (see the first embodiment discussed below). Because the group velocity of the Terahertz wave will be slower than that of the optical wave, one "stretches" the radiation. Furthermore, because one is phase-matched at one frequency only, only that frequency grows as the optical pulse travels down the guide. Hence, the radiation that emerges is not a stretched derivative pulse, but a sinusoidally varying signal with a large number of cycles, that number being determined by the difference between group velocities.

Thus, phase matching with a dispersive guiding structure is similar to phase matching with a periodically-poled material: one gets quasi single-frequency radiation having a duration much longer than the generating pulse. One significant difference is that using a guiding structure efficiently contains the radiation so that it all propagates in the forward direction. This is beneficial for systems where one wants to route the radiation efficiently, perhaps to various local oscillators. It also allows one to feed the energy into horns having the desired radiation pattern(s). Another advantage is that by properly sizing the nonlinear material, one can make the absorption loss of the guide be much less than the intrinsic loss of the material. Thus a guide that is only partially filled with a polymer having an absorption coefficient of ~4 $cm^{-1}$ can have an absorption coefficient substantially less than 1 $cm^{-1}$, thus allowing longer propagation distances, and hence greater conversion efficiencies.

An even better conversion efficiency can be obtained when one combines both techniques, i.e., uses a periodically-poled material together with a Terahertz guiding structure. By proper selection of dimensions and poling period, one can achieve both group and phase velocity matching. When this can be done, the conversion efficiencies may approach 100%. This cannot be done with all materials, and is particularly difficult to do with materials such as $LiNbO_3$, which have huge dielectric constants and large losses. However, poled polymers have the right values to allow this to happen.

The use of short pulses of light to effect optical-to-Terahertz conversion has a very important ancillary benefit: it bypasses the theoretical limit suffered by CW mixing processes. Thus, whereas dual-beam processes can achieve a maximum of 1 photon optical →one photon Terahertz, with an ultimate energy efficiency of less than 1%, the short pulse technique can reuse the left-over Stokes-shifted photons until most of the optical energy is converted into Terahertz energy. Spectrally, the optical pulse "rolls to the red" due to the Raman process of creating the Terahertz photons, but these red photons are just as effective as their blue predecessors, and hence carry on the conversion process. In principal, then, one can achieve 100% energy efficiency with our approach.

Briefly, and in general terms, the present invention provides an electromagnetic terahertz radiation source having a waveguide comprising either (i) a dielectric waveguide formed from a nonlinear material or (ii) a hollow metal waveguide having an interior cavity which partially filled with a nonlinear material; and a subpicosecond laser source generating a subpicosecond pulsed lightwave, the subpicosecond laser source exciting electromagnetic terahertz radiation in the waveguide via nonlinear optical rectification of said lightwave in said waveguide, the phase velocities of the lightwave and excited terahertz radiation being matched so that the efficiency of production of electromagnetic terahertz radiation is improved.

In another aspect the present invention also provides a method generating terahertz radiation source comprising: providing a waveguide formed of either a nonlinear dielectric material or formed by metal walls partially filled with a nonlinear material; generating a subpicosecond pulsed lightwave and applying same to said waveguide, the subpicosecond pulse lightwave exciting electromagnetic terahertz radiation in the waveguide via nonlinear optical rectification of said lightwave in said waveguide, and matching the phase velocities of the lightwave and excited terahertz radiation so that the efficiency of production of electromagnetic terahertz radiation is improved.

Other aspects of the present invention will become apparent to those skilled in the art upon reading this disclosure.

BRIEF DESCRIPTIONS OF THE DRAWINGS

FIGS. 2 and 2(a) depict an electromagnetic radiation source as described herein, FIG. 2 being an end-on view while FIG. 2(a) is a side elevation view.

DETAILED DESCRIPTION

Figure 1:
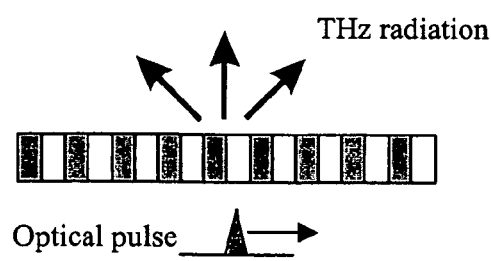
FIG. 1 depicts an optical pulse moving through a material that has been periodically poled, forming a local dipole moment that flips direction as it moves from one domain to the next. Thus, to an external observer, the dipole appears to be oscillating as it moves forward.

In one embodiment described herein, a short optical pulse generated by a laser 16 is used to excite a THz wave in a waveguide 10. See FIGS. 1, 2(a) and 2(b). The present disclosure shows that, contrary to the expectation of a rectified optical pulse shape, the group velocity mismatch of the THz and optical waves creates a slice of monochromatic THz wave, which is directed efficiently by the waveguide towards a target 22. It is believed that this technique should yield a power conversion efficiency of 10% or greater.

The proposed THz source includes a dielectric waveguide 10 and a subpicosecond laser source 16 that excites THz radiation in the waveguide 10 via nonlinear pulse rectification. The pulsed laser 16 typically produces a larger diameter beam 20 than the size (W) of the waveguide 10 and therefore a lens 22 is preferably used to focus the beam 20 onto the waveguide 10. When light (a lightwave) is applied to a dielectric, such as waveguide 10, an instantaneous polarization of the dielectric material occurs which oscillates at the same frequency as the lightwave. Certain nonlinear materials "rectify" this polarization and convert a small part of the oscillating polarization into a static polarization that is proportional to the intensity of the lightwave (i.e., to the square of the optical field E (t). This process is called "optical rectification."

When the lightwave is a pulse, the effect of this polarization is to create a small localized electric dipole in the nonlinear material that moves through the material with a velocity $c/n$, where $c$ is the speed of light in a vacuum and $n$ is the index of refraction of the material. The mechanism by which a non-oscillating dipole can produce oscillatory radiation is discussed below.

The source 16 preferably produces 1 µJ pulses of ~100-200 fs duration. The wavelength of source 16 is preferably at 1.55 mm or longer, since material dispersion is smaller at the longer wavelength range than in the visible or near IR. Such laser sources are known in the art.

Figure 2:
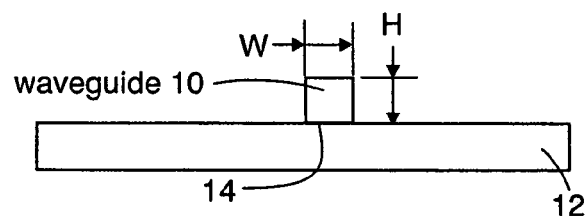
Figure 2A:
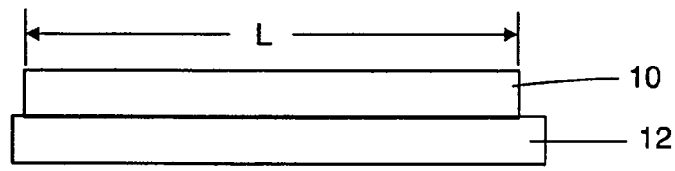
Figure 2B:
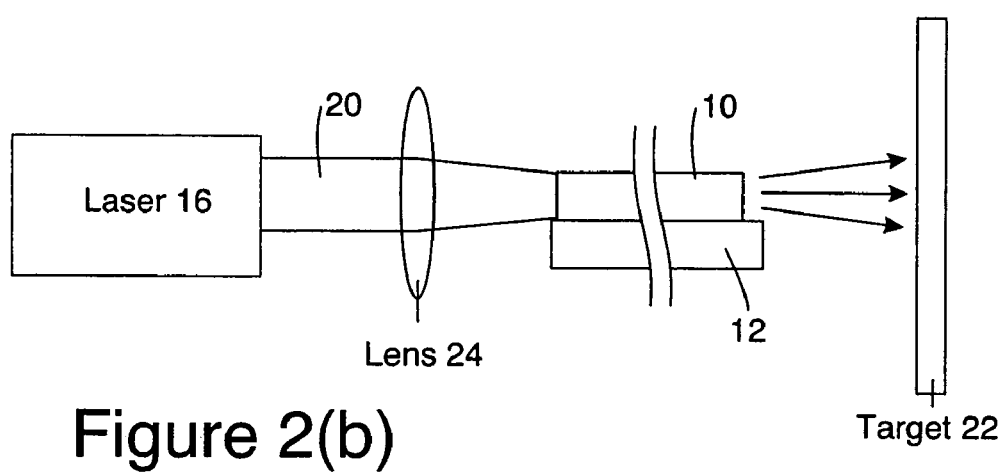
FIG. 2(b) shows the arrangement of laser, waveguide and a target.

The dielectric waveguide is preferably made of material that is transparent in the THz range ($\alpha$<1 cm$^{-1}$, e.g. GaSe or ZnGeP$_2$) and preferably has approximate dimensions of 55×55×10,000 microns. Referring to FIGS. 2 and 2(a), the waveguide 10 may be fabricated by bonding the nonlinear dielectric material, e.g. GaSe or ZnGeP$_2$, to a thick low-loss, low-index dielectric substrate 12 which (1) has optical and microwave indices of refraction that are lower than those of the waveguide 10 material, (2) has a low dielectric loss tangent so that it does not attenuate the THz radiation, (3) is transparent at the optical wavelength so that it does not attenuate the optical pulse and (4) ideally has the same or nearly the same thermal coefficient of expansion as the waveguide 10 material. After bonding the waveguide material to substrate 12 it is then processed to achieve a desired height and width of the waveguide 10. The preferred height and width of the waveguide material can vary according to the material used. 55 by 55 microns is one possible size. The size of the laser beam 20 is typically larger, and thus a lens 24 is preferably used to reduce the size of this beam so that is matches the size of the waveguide 10.

The presence of a lower-index dielectric substrate 12 beneath the square channel waveguide 10 forms a reflective surface 14 that preserves the bound nature of the THz dielectric waveguide mode. An optical pulse is launched into the dielectric waveguide at one end thereof and emerges from the other thereof. Because the sample length is longer than the beam waist length, one must launch the pulse so that it has the shape of the lowest order optical mode in the optically-multimoded guide 10. The pulse has three dimensions: height, width and length. The height and width are determined by the shape of the optical beam 20 at the receiving end surface of the THz waveguide 10. This shape will typically be circular with a Gaussian radial profile (i.e. intensity=$E^2(r)$=$\exp[-r^2/\alpha^2]$). The lowest order optical mode of the waveguide 10 will have an approximately $\{\cos[\pi x/2a]\cos[\pi y/2b]\}^2$ profile, which for a=b looks something like a circular Gaussian. Thus, if one positions the laser 16, the lens 24 and the waveguide 10 to achieve an appropriate beam demagnification, so that $\alpha$ equals a, then the two intensity profiles should be approximately the same and one then "launches" the lowest order mode of the waveguide 10. Note that the third dimension of the optical pulse, its length, plays no role in this matching.

Diffusion-limited chemical etching techniques may have to be used to smooth the waveguide 10 surfaces so that the optical pulse is not unduly attenuated by wall scattering.

The square waveguide 10 has degenerate THz frequencies corresponding to two field orientations (vertical and horizontal). However, the only one that will be excited is the one that corresponds to the direction of the induced polarization. Higher order modes cannot be excited for two reasons: (1) the phase matching condition is not satisfied, and (2) the overlap integral of the field and exciting polarization for these higher modes is essentially zero for a guide that is filled by the optical beam. The present waveguide approach thus produces monochromatic, single-mode, single polarization radiation.

Figure 3A:
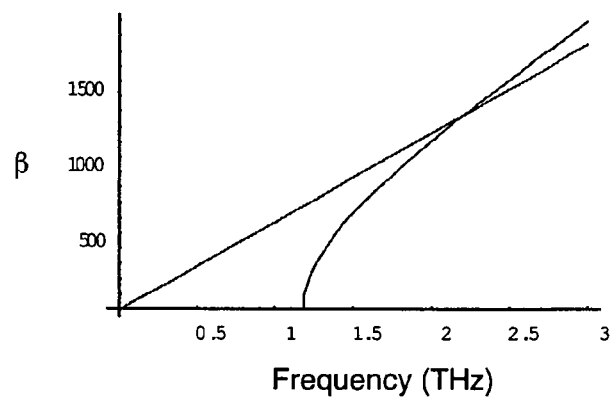
FIG. 3(a) is a depiction of the waveguide propagation constant ($\beta$) vs. frequency curves of a waveguide described herein with the straight line representing the optical pulse and the curved line representing the THz wave in the waveguide.
Figure 3B:
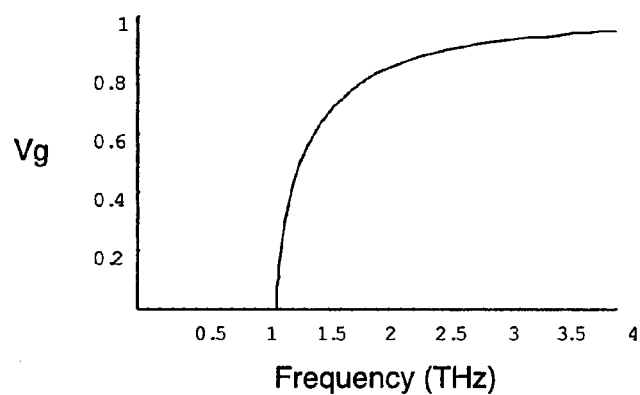
FIG. 3(b) depicts the group velocity of the waveguide, normalized $c/n_e$, where $n_e$ is the effective index of the nonlinear material.

The basic principle of this source is now described. The waveguide 10 has a propagation constant, $\beta$, that is a function of the frequency, as shown by the curved line in FIG. 3(*a*). There is a frequency where the value of $\beta$ matches that of an unbound wave having the optical velocity (illustrated by the straight line in FIG. 3(*a*). At this frequency the phase velocity of the THz wave matches the group velocity of the optical pulse (the moving dipole). When this occurs, energy is transferred from the optical pulse to the THz wave.

An interesting feature of this transfer is that the amplitude of the THz wave does not grow with distance, as it would if the group velocities of the two waves were matched. The amplitude of the field is determined at the instant it is generated, and does not change. What does change as the pulse moves down the waveguide 10 is the length of the THz wave. Each part of the wave is formed at the pulse, but falls behind the pulse because of its slower group velocity (see FIG. 3 (b)). The net effect is a wave that, from the moving pulse's point of view, is growing backwards down the guide.

Figure 4:
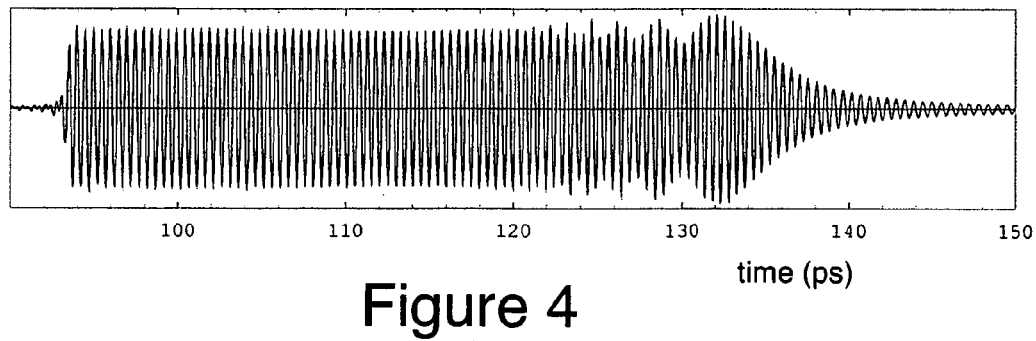
FIG. 4 is a depiction of a numerical simulation of a 2-THz waveform produced by an electromagnetic radiation source having phase matching as described herein.

To understand how a non-oscillating moving dipole can produce oscillatory radiation, it helps to posit the physical interpretation that the dipole is moving through a medium at a velocity that is faster than the speed of light for the THz wave in that medium. The dipole emits a bow-wave of single-cycle zero-area (positive and negative) Cherenkov radiation, rather like a speed-boat in a river. This single-cycle bow-wave reflects off the walls of the waveguide 10 and pieces together through multiple reflections and interference a continuous and progressively longer forward-propagating wave traveling at the THz group velocity. Thus, the first cycle of radiation that emerges from the waveguide was the last cycle formed, whereas the last cycle out is the first that was formed! The total length of the pulse is proportional to the length L of waveguide 10. The long pulse formed by the present waveguide 10 is shown in FIG. 4, which illustrates a numerical simulation of the 2-THz waveform produced by the presently described GaSe phase-matched dielectric waveguide source 16. The abrupt start at 93 ps corresponds to the optical transit time through the 1-cm length of waveguide 10.

The expression for the theoretical efficiency of the waveguide source 16 is almost identical to that for the PPLN side-emitter. The calculations reproduced below predict a theoretical efficiency of 10% at 2.2 GHz for a 55 micron square GaSe waveguide 10 and a one-microjoule pulse. A waveguide source 16 made from $ZnGeP_2$ may have even higher efficiencies.

General Treatment $$\nabla^2 E - \frac{1}{c^2}\frac{d^2 E}{dt^2} = \mu_0 \frac{d^2 P_L}{dt^2} + \mu_0 \frac{d^2 P_{NL}}{dt^2} \quad (1.1)$$

Here, $$P_L = \varepsilon_0 \int_{-\infty}^{\infty} d\tau \chi^{(1)}(t-\tau)E(\tau) \quad (1.2)$$

$$P_{NL} = \varepsilon_0 \int\int_{-\infty}^{\infty} d\tau_1 d\tau_2 \chi^{(2)}(t-\tau_1, t-\tau_2)E(\tau_1)E*(\tau_2) \quad (1.3)$$

-continued
$$= \varepsilon_0 \chi^{(2)} |E_o(z,t)|^2$$

where E, $E_o$ are terahertz and optical fields, respectively.

$$\nabla^2 E(r,z,\omega) + \frac{\omega^2}{c^2}E(r,z,\omega) = \quad (1.4)$$
$$\frac{1}{c^2}\int_{-\infty}^{\infty} d\tau E(r,z,\tau)e^{i\omega\tau}\int_{-\infty}^{\infty} dt e^{i\omega(t-\tau)}\frac{d^2}{dt^2}\chi^{(1)}(t-\tau) +$$
$$\frac{1}{c^2}\chi^{(2)}\int_{-\infty}^{\infty} dt e^{i\omega t}\frac{d^2}{dt^2}|E_o(r,z,t)|$$

Take the Fourier transform ($xe^{i\omega t}$dt) of (1.4)

$$\nabla^2 E(r,z,\omega) + \frac{\omega^2}{c^2}E(r,z,\omega) = \quad (1.5)$$
$$\frac{1}{c^2}\int_{-\infty}^{\infty} d\tau E(r,z,\tau)e^{i\omega\tau}\int_{-\infty}^{\infty} dt e^{i\omega(t-\tau)}\frac{d^2}{dt^2}\chi^{(1)}(t-\tau) +$$
$$\frac{1}{c^2}\chi^{(2)}\int_{-\infty}^{\infty} dt e^{i\omega t}\frac{d^2}{dt^2}|E_o(r,z,t)|$$

where $$E(r,z,\omega) = \int_{-\infty}^{\infty} dt e^{i\omega t} E(r,z,t)$$

is the spectral density of the electric field. It is measured in [sV/rm].

$$\nabla^2 E(r,z,\omega) + \frac{\omega^2}{c^2}E(r,z,\omega) = \quad (1.6)$$
$$-\frac{\omega^2}{c^2}\chi^{(1)}(\omega)E(r,z,\omega) - \frac{\omega^2}{c^2}\chi^{(2)}A(r,z,\omega)$$

where $$A(r,z,\omega) = \int_{-\infty}^{\infty} dt e^{i\omega t}|E_o(r,z,t)|^2.$$

Now taking into account that the optical field propagates (without dispersion) along z at a group velocity $v_o$, i.e., $$E_o(r,z,t) = E_o(r,t-z/v_o).$$

$$\nabla^2 E(r,z,\omega) + n^2\frac{\omega^2}{c^2}E(r,z,\omega) = -\frac{\omega^2}{c^2}e^{i\omega z/v_o}\chi^{(2)}A(r,\omega), \quad (1.7)$$

$$A(r,\omega) = \quad (1.8)$$

-continued $$\int_{-\infty}^{\infty} dt e^{i\omega t} |E_o(r,0,t)|^2 = I_o(r) \int_{-\infty}^{\infty} dt e^{i\omega t} |E_o(t)|^2 = I_o(r)A_0(\omega)$$

and $$n^2 = \epsilon(\omega) = 1 + \chi^{(1)}. \tag{1.9}$$

$I_0(r)$ is dimensionless, and we normalize so that the integral over the beam cross section equals one. Now we take into account that $E(r,z,\omega) = A_m(z,\omega)B_m(r)e^{i\beta_m z}$.

$$\nabla^2 E(r,z,\omega) = A_m(z)e^{i\beta_m z}\left(\frac{d^2}{dx^2} + \frac{d^2}{dy^2} - \beta_m^2\right)B_m(x,y) + \tag{1.10}$$
$$B_m(x,y)e^{i\beta_m z}\left(\frac{d^2 A_m}{dz^2} + 2i\beta_m \frac{dA_m}{dz}\right)$$

Substituting (1.10) into (1.7), we get $$A_m(z)e^{i\beta_m z}\left[\frac{d^2}{dx^2} + \frac{d^2}{dy^2} - \beta_m^2 + n^2\frac{\omega^2}{c^2}\right]B_m(x,y) + \tag{1.11}$$
$$B_m(x,y)e^{i\beta_m z}\left(\frac{d^2 A_m}{dz^2} + 2i\beta_m \frac{dA_m}{dz}\right) =$$
$$-\frac{\omega^2}{c^2} e^{i\omega z/v_o} \chi^{(2)} I_o(x,y) A_o(\omega)$$

Taking into account that the equation defining transverse modes of the THz guide is $$\left(\frac{d^2}{dx^2} + \frac{d^2}{dy^2}\right)B_m(x,y) + \left(n^2\frac{\omega^2}{c^2} - \beta_m^2\right)B_m(x,y) = 0,$$

we get $$B_m(x,y)e^{i\beta_m z}\left(\frac{d^2 A_m}{dz^2} + 2i\beta_m \frac{dA_m}{dz}\right) = -\frac{\omega^2}{c^2}e^{i\omega z/v_o}\chi^{(2)}I_o(x,y)A_o(\omega). \tag{1.12}$$

Multiplying (1.12) by $B_m(x,y)$ and integrating over the cross section of the guide, we obtain $$\frac{d^2 A_m}{dz^2} + 2i\beta_m \frac{dA_m}{dz} = \tag{1.13}$$
$$-\frac{\omega^2}{c^2} e^{i\omega z/v_o} e^{-i\beta_m z} \chi^{(2)} A_o(\omega) \int dxdy I_o(x,y) B_m(x,y) /$$
$$\int dxdy B_m^2(x,y)$$

Assuming that the optical field is confined to a small fraction of the THz waveguide 10, one can write $$\frac{d^2 A_m}{dz^2} + 2i\beta_m \frac{dA_m}{dz} = -\frac{\omega^2}{c^2} e^{i\omega z/v_o} e^{-i\beta_m z} \chi^{(2)} A_o(\omega) \frac{\varepsilon_o}{\langle \varepsilon_o^2 \rangle S}, \tag{1.14}$$

where $\epsilon_0/\langle\epsilon_o^2\rangle$ is ratio of the THz field at the optical beam to its average value and S is the cross section of the THz waveguide 10.

Seeking the solution of (1.14) in the form $$A_m(z) = \text{const} + C \exp(i(\omega/v_o - \beta_m)Z) \tag{1.15}$$

Then, $$-C(\omega/v_o - \beta_m)^2 - 2C\beta_m(\omega/v_o - \beta_m) = \frac{\omega^2}{c^2}\chi^{(2)}A_o(\omega)\frac{\varepsilon_o}{\langle\varepsilon_o^2\rangle S} \tag{1.16}$$

Then, $$C = \frac{\omega^2}{c^2} \frac{\chi^{(2)}A_o(\omega)}{(\beta_m^2 - \beta_o^2)} \frac{\varepsilon_o}{\langle\varepsilon_o^2\rangle S} \tag{1.17}$$

where $\beta_o = \omega/v_o = \omega n_o/c$ and const$=-C$, since $A_m(0)=0$. Therefore, $$A_m(z) = \frac{\omega^2}{c^2} \frac{\chi^{(2)}A_o(\omega)}{(\beta_m^2 - \beta_o^2)} \frac{\varepsilon_o}{\langle\varepsilon_o^2\rangle S}(\exp(i(\beta_o - \beta_m)z) - 1) \tag{1.18}$$

Neglecting waveguide dispersion, $$\beta_m = \beta(\omega_0) + \dot{\beta}\delta\omega \tag{1.19}$$

where $$\dot{\beta} = 1/v_{THz}(\omega_0) \tag{1.20}$$

Phase matching of terahertz and optical waves are $$\beta_m(\omega_0) = \beta_o(\omega_0) \tag{1.21}$$

Substituting the above into (1.18), one obtains $$A_m(L) = \frac{\chi^{(2)}}{c^2} \frac{\omega^2 A_o(\omega)}{(\beta_o + \beta_m)} \frac{\varepsilon_o}{\langle\varepsilon_o^2\rangle S} \frac{\left(\exp\left(iL\delta\omega\left(\frac{1}{v_o} - \frac{1}{v_{THz}}\right)\right) - 1\right)}{\delta\omega\left(\frac{1}{v_o} - \frac{1}{v_{THz}}\right)} \tag{1.22}$$

We note that the last term in (1.22) containing $\delta\omega$ is a sharp function of centered at zero. Therefore, it is safe to take $\omega^2 A_o(\omega)/(\beta_o + \beta_m)$ at $\omega=\omega_0$. Then, $$A_m(L) = \frac{\chi^{(2)}\omega_0}{2cn_o} A_o(\omega_0) \frac{\varepsilon_o}{\langle\varepsilon_o^2\rangle S} \frac{\left(\exp\left(iL\delta\omega\left(\frac{1}{v_o} - \frac{1}{v_{THz}}\right)\right) - 1\right)}{\delta\omega\left(\frac{1}{v_o} - \frac{1}{v_{THz}}\right)} \tag{1.23}$$

The time dependence of the THz waveform is given by the inverse Fourier transform of (1.23):

$$A(t) = \frac{\chi^{(2)}\omega_0}{2cn_o} A_o(\omega_0) \frac{\varepsilon_o}{\langle\varepsilon_o^2\rangle S} \times \quad (1.24)$$

$$\frac{1}{2\pi} \int_{-\infty}^{\infty} d(\omega_0 + \delta\omega) e^{-i(\omega_0+\delta\omega)t} \frac{\left(\exp\left(iL\delta\omega\left(\frac{1}{v_o} - \frac{1}{v_{THz}}\right)\right) - 1\right)}{\delta\omega\left(\frac{1}{v_o} - \frac{1}{v_{THz}}\right)}$$

Note that $$\frac{1}{2\pi} \int_{-\infty}^{\infty} d\omega e^{-i\omega t} \frac{\left(\exp\left(iL\delta\omega\left(\frac{1}{v_o} - \frac{1}{v_{THz}}\right)\right) - 1\right)}{\delta\omega\left(\frac{1}{v_o} - \frac{1}{v_{THz}}\right)} = \quad (1.25)$$

$$ie^{-i\omega_0 t}\left(\frac{1}{v_o} - \frac{1}{v_{THz}}\right)^{-1} R(t)$$

where R(t) is a top-hat function $$R(t)=1, 0<t<L/(1/v_{THz}-1/v_o); \; R(t)=0 \text{ elsewhere} \quad (1.26)$$

Then, $$A(t) = -i\frac{\chi^{(2)}\omega_0}{2cn_o} A_o(\omega_0) \frac{\varepsilon_o}{\langle\varepsilon_o^2\rangle S}(1/v_{THz} - 1/v_{THz})^{-1} e^{-i\omega_0 t} R(t) \quad (1.27)$$

For short optical pulses, $$A(\omega_0) = \int dt e^{i\omega_0 t} |E(t)|^2 \approx \int dt |E(t)|^2 = \frac{2z_0}{n_o} W_o \quad (1.28)$$

where $W_o$ is the energy of the optical pulse, we get $A(t) = -i\frac{\omega_0}{c} \frac{\chi^{(2)} z_0}{n_o^2 \left(\frac{1}{v_o} - \frac{1}{v_{THz}}\right)} \frac{\varepsilon_o}{\langle\varepsilon_o^2\rangle} \frac{W_o}{S} e^{-i\omega_0 t} R(t) \quad (1.29)$ The THz power of a waveguide mode is given by $$P_{THz}(t) = \frac{n_e}{2z_0}\left(1 - \left(\frac{\omega_c}{\omega}\right)^2\right)^{1/2} |A(t)|^2 \int dx dy B_m^2(x,y) \quad (1.30)$$

where $n_e$ and $\omega_c$ are the refractive index of the waveguide 10 material and its cut-off frequency, respectively. Substituting (1.29), we get $$P_{TNz}(t) = \frac{n_e}{2n_o^4}\left(1 - \left(\frac{\omega_c}{\omega}\right)^2\right)^{1/2} \frac{\chi^{(2)^2} z_0 \omega_0^2}{\left(c\left(\frac{1}{v_o} - \frac{1}{v_{THz}}\right)\right)^2} \frac{\varepsilon_o^2}{\langle\varepsilon_o^2\rangle} \frac{W_o^2}{S} R(t) \quad (1.31)$$

Here, $\varepsilon_0^2/\langle\varepsilon_0^2\rangle$ is the average overlap between the optical and THz field. It reaches ~2 if a sharp optical field is placed close to the center of the THz waveguide 10, and it is approximately 1 if the optical and THz fields coincide. The optical field is the E-field of the lightwave, which is transverse and which is orientated so that it is either vertical or horizontal in FIG. 2. Thus, for a vertical polarization the E-field is given by $E(r)=\exp[-r^2/a^2]\hat{y}$. This E-field is generated by laser 16. The dimension a, which determines the size of the beam at the waveguide 10, is adjusted by adjusting the position of lens 24 in FIG. 2(b).

Then, the THz pulse energy is $$W_{THz} = \frac{2\pi^2 n_e}{n_o^4}\left(1 - \left(\frac{\omega_c}{\omega}\right)^2\right)^{1/2} \frac{\varepsilon_o^2}{\langle\varepsilon_o^2\rangle} \chi^{(2)^2} z_0 \frac{v_0^2 L}{c^2\left(\frac{1}{v_{THz}} - \frac{1}{v_o}\right)} \frac{W_o^2}{S} \quad (1.32)$$

and conversion efficiency is $$\eta = \frac{2\pi^2 n_e}{n_o^4}\left(1 - \left(\frac{\omega_c}{\omega}\right)^2\right)^{1/2} \frac{\varepsilon_o^2}{\langle\varepsilon_o^2\rangle} \chi^{(2)^2} z_0 \frac{v_0^2 L}{c^2\left(\frac{1}{v_{THz}} - \frac{1}{v_o}\right)} \frac{W_o}{S} \quad (1.33)$$

Now taking into account that the propagation constant in a square dielectric THz waveguide 10 is approximately given by $$\beta = \sqrt{\left(\frac{\omega n_e}{c}\right)^2 - 2\left(\frac{\pi}{a}\right)^2} = \frac{\omega n_e}{c}\left(1 - \left(\frac{\omega_c}{\omega}\right)^2\right)^{1/2} \quad (1.34)$$

where $n_e$ is the index of the waveguide material and the critical frequency of the waveguide $\omega_c^2=2(\pi c/an_e)^2$. The inverse group velocity of the THz wave is $$\beta' = \frac{1}{v_{THz}} = \frac{1}{\beta(\omega_0)}\omega_0 \frac{n_e^2}{c^2} = \frac{n_e^2}{n_o c} \quad (1.35)$$

where we took into account the phase matching conditions $\beta(\omega_0)=\omega_0 n_o/c$. From the phase matching condition we also get $$\left(1 - \left(\frac{\omega_c}{\omega}\right)^2\right)^{1/2} = \frac{n_o}{n_e} \quad (1.36)$$

Using (1.35), we obtain $$c\left(\frac{1}{v_{THz}} - \frac{1}{v_o}\right) = (n_e^2 - n_o^2)/n_o \quad (1.37)$$

$$\eta = \frac{2\pi^2}{n_o^2(n_e^2 - n_o^2)} \frac{\varepsilon_o^2}{\langle\varepsilon_o^2\rangle} \chi^{(2)^2} z_0 \frac{v_0^2 L}{c} \frac{W_o}{S} \quad (1.38)$$

Now calculate $v_0$. From phase matching conditions we have $$\frac{\omega_0 n_o}{c} = \sqrt{\left(\frac{\omega_0 n_e}{c}\right)^2 - 2\left(\frac{\pi}{a}\right)^2} \quad (1.39)$$

which results in $$a^2 = \frac{c^2}{2v_0^2(n_e^2 - n_o^2)} \quad (1.40)$$

In estimating the effective mode area S we assume that THz field has a Gaussian profile $B=\exp(-(r/r_0)^2$ and that on the waveguide boundary $\exp(-(a/2r_0)^2=\exp(-2)$. Then $$S = \pi r_0^2 = \pi a^2/8 = \frac{\pi c^2}{16(n_e^2 - n_o^2)v_0^2} \quad (1.41)$$

and $$\eta = \frac{32\pi}{n_o^2} \frac{\varepsilon_o^2}{\langle \varepsilon_o^2 \rangle} \chi^{(2)2} z_0 \frac{v_0^4 L}{c^3} W_o \quad (1.42)$$

For GaSe, $n_o=2.8$, $n_e=3.39$, $\chi^{(2)}=54$ pm/V. Since optical and THz fields coincide, $\varepsilon_o^2/\langle\varepsilon_o^2\rangle\sim 1$, and we get $\eta=0.0861/$ µJ/cm for L=1 cm, $v_0=2$ THz and $W_0=1$ µJ. The size of the THz waveguide 10 is calculated a=55.5 µm for these conditions.

In a further embodiment presently described herein, a THz electromagnetic radiation generation technique is proposed that achieves both phase and group velocity matching in a nonlinear waveguide.

THz radiation can be generated by pumping a nonlinear waveguide 10 by short optical pulses. In the first described embodiment, the material of waveguide 10 is nonlinear. However, in this second embodiment the waveguide 10 material is also periodically-poled. The optical source 16 produces 1 µJ pulses of ~100-200 fs duration. The wavelength of the source 16 is preferably at 1.55 mm or longer, since material dispersion is smaller at the longer wavelength range than in the visible or near IR. Such laser sources 16 are known in the art.

The waveguide 10 is filled with a nonlinear material that is transparent in the THz region ($\alpha<1$ cm$-1$, preferably) and is periodically poled (i.e., the direction of its nonlinear dipole moment is inverted periodically along the waveguide axis) as just mentioned. Such poling has been demonstrated recently in lithium niobate and similar materials, and also in polymers. However, while lithium niobate is periodically poled, it is not the most desirable material to use in this embodiment for the waveguide 10 because it has a relatively high index of refraction. Special polymers that produce a high electro-optic effect (i.e. exhibit nonlinearity), that can be poled, are preferred. See A. M. Sinyukov and L. M. Hayden, "Efficient Electrooptic Polymers for THz Applications", J. Phys. Chem. B 108, pp. 8515-8522 (2004), the disclosure of which is hereby incorporated herein by reference.

Figure 2C:
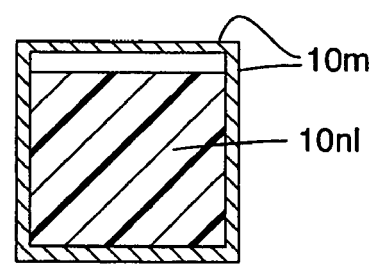
FIG. 2(c) shows another embodiment of a waveguide, this one having metallic walls and being partially filled with a nonlinear, and preferably a periodically-poled, material.
Figure 5A:
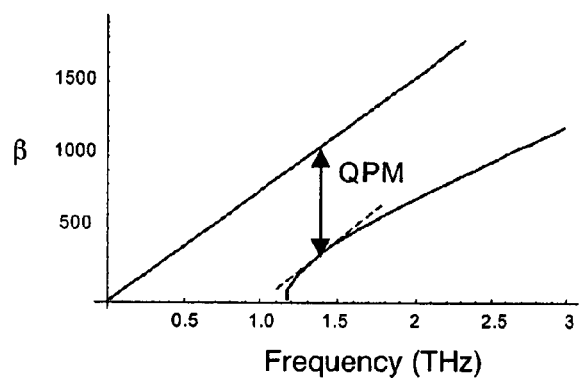
FIG. 5(a) is a depiction of the waveguide propagation constant ($\beta$) vs. frequency curves of a waveguide, with the straight line again representing the optical pulse and the curved line representing the THz wave in the waveguide. Because the phase velocity matching is now provided by the waveguide dispersion and the periodically-poled structure, the two curves no longer need to intersect.
Figure 5B:
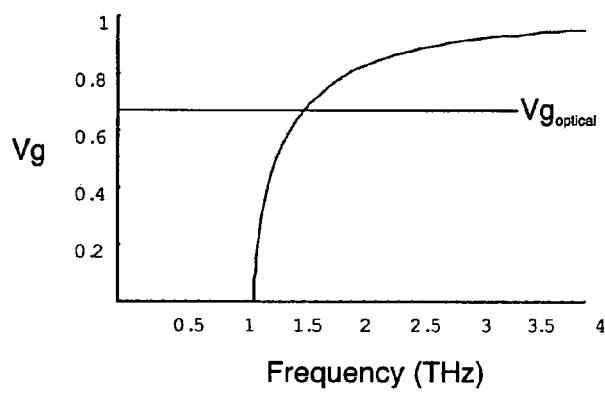
FIG. 5(b) depicts the normalized group velocity for the optical wave (the straight line) and the THz wave (the curved line). The intersection of the two is the point at which the group velocities are matched.

The dispersion properties of optical and guided THz radiation are shown in FIG. 4 according to the present embodiment. The phase velocities of two fields are matched using periodic poling and the waveguide dispersion, the group velocities using just the waveguide dispersion. To do this, one must have a material that has an effective index of refraction at THz frequencies that is slightly lower than that at optical frequencies. One can achieve this seemingly impossible condition by partially filling a metal waveguide with the nonlinear material. See FIG. 2(c) which depicts an end view of a partially-filled metal waveguide 10. Its metal walls 10m preferably have a rectangular shape, similar to a conventional microwave waveguide, but much smaller in size, and have open ends transparent to the terahertz radiation at least the output end and transparent to the optical beam 20 at both ends thereof. As can be seen in FIG. 2(c) the waveguide interior is partially filled with a nonlinear waveguide material 10nl. The cross sectional size of the waveguide is constant along it length L, and therefore would look much like the waveguide depicted in FIG. 2(a) except that no substrate is typically used as the metal walls 10m can be self-supporting. Because the effective index will be a weighted average of the material 10nl and of air (assuming that the top portion of the waveguide shown in FIG. 2(c) is filled with air—it instead could be filled with some other material or gas, if desired), this index will be lower than that of the material 10nl. One can then slow this wave down by operating at the appropriate point on FIG. 5(b), and using periodic poling to quasi phase-match the corresponding point on FIG. 5(a). Poling is done by applying large periodic static electric fields while the material 10nl is at either an elevated temperature (in the case of polymers) or at room temperature (in the case of LiNbO$_3$, see Gregory David Miller, "Periodically Poled Lithium Niobate: Modeling, Fabrication and Non-Linear-Optical Performance", PhD dissertation, Stanford University, July 1998, the disclosure of which is hereby incorporated herein by reference.

Dimensions for metal waveguides partially filled with nonlinear polymers are somewhat larger (~70 by 70 microns) than those describer earlier with reference to the first embodiment, with the exact dimensions depending on the material used and the desired frequency of operation. In the first embodiment, the waveguide shown in FIGS. 2 and 2(a) is a nonlinear dielectric waveguide and typically would not have metal walls like the embodiment of FIG. 2(c). Since the first embodiment uses a dielectric waveguide, the THz fields are bound by the difference in dielectric constant between air (for example) and the waveguide material. In the present embodiment, a metal waveguide is used to perform the same function (bind the THz fields).

Because the group velocities are now matched, one begins to grow a single-cycle pulse. This single cycle, however, has a wide bandwidth that is group-velocity-matched at one frequency only. Because of the group velocity dispersion at neighboring frequencies, these frequencies loose interaction with the pump pulse quickly and cease to grow. As a result, quasi-monochromatic radiation is produced at the end, as can be seen from FIG. 6. It is important to stress that THz pulse dispersion is now considerably less pronounced than in conventional phase matching (i.e., when only phase, but no group velocity is matched), since it is now governed by the second order effect in de-tuning, i.e., $\propto \ddot\beta \delta\omega^2$, compared to the first order effect for conventional phase matching, i.e., $\propto \dot\beta \delta\omega$. Therefore, the total energy in this pulse is greater than that in the longer phase-matched-only wave.

Because the group velocities are now matched to first order, one grows a narrower waveform that is strongly peaked spectrally and temporally at the match frequency. The total energy in this narrower waveform, however, is greater than that in the longer phase-matched-only wave. Because this is a quasi-matching technique, not a true group velocity match, the efficiency is proportional to $L^{1.5}$, and not $L^2$.

A numerical example considered below assumes $n_o=2$, $n_e=1.5$, $v_0=2$ THz, $L=1$ cm and the nonlinear coefficient $\chi^{(2)}=54$ pm/V equal to that of GaSe. Then we get $\eta=0.5/\mu J$. This is considerably better than the conversion efficiency obtained in a similar device with phase matching only, i.e., $\eta=0.085/\mu J$. For these conditions, we get the size of the larger side of the waveguide $a=68$ μm and the QPM period $d=102$ μm.

The calculations effectuating the above are shown below.

General Treatment $$\nabla^2 E - \frac{1}{c^2}\frac{d^2 E}{dt^2} = \mu_0 \frac{d^2 P_L}{dt^2} + \mu_0 \frac{d^2 P_{NL}}{dt^2} \quad (2.1)$$

Here, $$P_L = \varepsilon_0 \int_{-\infty}^{\infty} d\tau \chi^{(1)}(t-\tau)E(\tau) \quad (2.2)$$

$$P_{NL} = \varepsilon_0 \int\int_{-\infty}^{\infty} d\tau_1 d\tau_2 \chi^{(2)}(t-\tau_1, t-\tau_2)E(\tau_1)E*(\tau_2) \quad (2.3)$$
$$= \varepsilon_0 \chi^{(2)} |E_o(z,t)|^2$$

where E, $E_o$ are terahertz and optical fields, respectively.

$$\nabla^2 E(r,z,\omega) + \frac{\omega^2}{c^2}E(r,z,\omega) = \quad (2.4)$$
$$\frac{1}{c^2}\int_{-\infty}^{\infty}d\tau E(r,z,\tau)e^{i\omega\tau}\int_{-\infty}^{\infty}dt e^{i\omega(t-\tau)}\frac{d^2}{dt^2}\chi^{(1)}(t-\tau) +$$
$$\frac{1}{c^2}\chi^{(2)}\int_{-\infty}^{\infty}dt e^{i\omega t}\frac{d^2}{dt^2}|E_o(r,z,t)|$$

Take the Fourier transform ($xe^{i\omega t}dt$) of (2.4)

$$\nabla^2 E(r,z,\omega) + \frac{\omega^2}{c^2}E(r,z,\omega) = \quad (2.5)$$
$$\frac{1}{c^2}\int_{-\infty}^{\infty}d\tau E(r,z,\tau)e^{i\omega\tau}\int_{-\infty}^{\infty}dt e^{i\omega(t-\tau)}\frac{d^2}{dt^2}\chi^{(1)}(t-\tau) +$$
$$\frac{1}{c^2}\chi^{(2)}\int_{-\infty}^{\infty}dt e^{i\omega t}\frac{d^2}{dt^2}|E_o(r,z,t)|$$

where $$E(r,z,\omega) = \int_{-\infty}^{\infty}dt e^{i\omega t}E(r,z,t)$$

is the spectral density of the electric field. It is measured in [sV/m].

$$\nabla^2 E(r,z,\omega) + \frac{\omega^2}{c^2}E(r,z,\omega) = \quad (2.6)$$
$$-\frac{\omega^2}{c^2}\chi^{(1)}(\omega)E(r,z,\omega) - \frac{\omega^2}{c^2}\chi^{(2)}A(r,z,\omega)$$

where $$A(r,z,\omega) = \int_{-\infty}^{\infty}dt e^{i\omega t}|E_o(r,z,t)|^2.$$

Now we take into account that the optical field propagates (without dispersion) along z at a group velocity $v_o$, i.e., $$E_o(r,z,t)=E_o(r,t-z/v_o)$$

$$\nabla^2 E(r,z,\omega) + n^2\frac{\omega^2}{c^2}E(r,z,\omega) = -\frac{\omega^2}{c^2}e^{i\omega z/v_o}\chi^{(2)}A(r,\omega) \quad (2.7)$$

$$A(r,\omega) = \quad (2.8)$$
$$\int_{-\infty}^{\infty}dt e^{i\omega t}|E_o(r,0,t)|^2 = I_o(r)\int_{-\infty}^{\infty}dt e^{i\omega t}|E_o(t)|^2 = I_o(r)A_0(\omega)$$

and $$n^2=\epsilon(\omega)=1+\chi^{(1)}(\omega) \quad (2.9)$$

$I_o(r)$ is dimensionless, and we normalize so that the integral over the beam cross section equals one. Now we take into account that $$E(r,z,\omega)=A_m(z,\omega)B_m(r)e^{i\beta_m z}.$$

$$\nabla^2 E(r,z,\omega) = A_m(z)e^{i\beta_m z}\left(\frac{d^2}{dx^2}+\frac{d^2}{dy^2}-\beta_m^2\right)B_m(x,y) + \quad (2.10)$$
$$B_m(x,y)e^{i\beta_m z}\left(\frac{d^2 A_m}{dz^2}+2i\beta_m\frac{dA_m}{dz}\right)$$

Substituting (2.10) into (2.7), we get $$A_m(z)e^{i\beta_m z}\left[\frac{d^2}{dx^2}+\frac{d^2}{dy^2}-\beta_m^2+n^2\frac{\omega^2}{c^2}\right]B_m(x,y) + \quad (2.11)$$
$$B_m(x,y)e^{i\beta_m z}\left(\frac{d^2 A_m}{dz^2}+2i\beta_m\frac{dA_m}{dz}\right) =$$
$$-\frac{\omega^2}{c^2}e^{i\omega z/v_o}\chi^{(2)}I_o(x,y)A_o(\omega)$$

Taking into account that the equation defining transverse modes of the THz guide is $$\left(\frac{d^2}{dx^2} + \frac{d^2}{dy^2}\right)B_m(x, y) + \left(n^2\frac{\omega^2}{c^2} - \beta_m^2\right)B_m(x, y) = 0,$$

we get $$B_m(x, y)e^{i\beta_m z}\left(\frac{d^2 A_m}{dz^2} + 2i\beta_m \frac{dA_m}{dz}\right) = -\frac{\omega^2}{c^2} e^{i\omega z/v_o} \chi^{(2)} I_o(x, y) A_o(\omega). \quad (2.12)$$

Multiplying (2.12) by $B_m(x, y)$ and integrating over the cross section of the guide, we obtain $$\frac{d^2 A_m}{dz^2} + 2i\beta_m \frac{dA_m}{dz} = -\frac{\omega^2}{c^2} e^{i\omega z/v_o} e^{-i\beta_m z} \chi^{(2)} A_o(\omega) \int dx dy I_o(x, y) B_m(x, y) \Big/ \int dx dy B_m^2(x, y) \quad (2.13)$$

Assuming that the optical field is confined to a small fraction of the THz waveguide, we write $$\frac{d^2 A_m}{dz^2} + 2i\beta_m \frac{dA_m}{dz} = -\frac{\omega^2}{c^2} e^{i\omega z/v_o} e^{-i\beta_m z} \chi^{(2)} A_o(\omega) \frac{\varepsilon_o}{\langle \varepsilon_o^2 \rangle S} \quad (2.14)$$

where $\varepsilon_0/\langle \varepsilon_o^2 \rangle$ is ratio of the THz field at the optical beam to its average value and S is the cross section of the THz waveguide.

THz excitation in QPM materials with group velocity match is calculated as follows. In QPM structures, the direction of the nonlinear polarization changes sign in consecutive sections. Then, the field generated in the k-th domain (k=0, 1, . . . ,N) is given by $$\frac{d^2 A_m}{dz^2} + 2i\beta_m \frac{dA_m}{dz} = (-1)^{k+1} \frac{\omega^2}{c^2} e^{i\omega z/v_o} \chi^{(2)} A_o(\omega) \frac{\varepsilon_o}{\langle \varepsilon_o^2 \rangle S} \quad (2.15)$$

We seek the solution of (2.15) in the form $$A_m(z) = \text{const} + C \exp(i(\omega/v_o - \beta_m)Z) \quad (2.16)$$

Then, $$-C(\omega/v_o - \beta_m)^2 - 2C\beta_m(\omega/v_o - \beta_m) = (-1)^{k+1} \frac{\omega^2}{c^2} \chi^{(2)} A_o(\omega) \frac{\varepsilon_o}{\langle \varepsilon_o^2 \rangle S} \quad (2.17)$$

Since $(\omega/v_o - \beta_m) \neq 0$ in QPM materials, $$C = (-1)^k \frac{\omega^2}{c^2} \frac{\chi^{(2)} A_o(\omega)}{(\beta_o^2 - \beta_m^2)} \frac{\varepsilon_o}{\langle \varepsilon_o^2 \rangle S} \quad (2.18)$$

where $\beta_o = \omega/v_o$, and $\text{const} = -C \exp(ikd(\beta_0 - \beta_m))$, since $A_m(kd) = 0$. Then, the field generated in the k-th domain is given by $$A_m(z) = (-1)^k \frac{\omega^2}{c^2} \frac{\chi^{(2)} A_o(\omega)}{(\beta_m^2 - \beta_0^2)} \frac{\varepsilon_o}{\langle \varepsilon_o^2 \rangle S} e^{ikd(\beta_0 - \beta_m)}(e^{i(z-kd)(\beta_0 - \beta_m)} - 1) \quad (2.19)$$

At the end of the k-th domain $$A_m(kd + d) = \frac{\omega^2}{c^2} \frac{\chi^{(2)} A_o(\omega)}{(\beta_m^2 - \beta_0^2)} \frac{\varepsilon_o}{\langle \varepsilon_o^2 \rangle S} e^{ik(d(\beta_0 - \beta_m) - \pi)}(e^{id(\beta_0 - \beta_m)} - 1) \quad (2.20)$$

The sum of the fields from all the domains $$A_m = \frac{\omega^2}{c^2} \frac{\chi^{(2)} A_o(\omega)}{(\beta_m^2 - \beta_0^2)} \frac{\varepsilon_o}{\langle \varepsilon_o^2 \rangle S} (1 - e^{id(\beta_0 - \beta_m)}) \sum_{k=0}^{N} e^{ik(d(\beta_0 - \beta_m) - \pi)} \quad (2.21)$$

$$= \frac{\omega^2}{c^2} \frac{\chi^{(2)} A_o(\omega)}{(\beta_m^2 - \beta_0^2)} \frac{\varepsilon_o}{\langle \varepsilon_o^2 \rangle S} (1 - e^{id(\beta_0 - \beta_m)}) \frac{e^{i(N+1)(d(\beta_0 - \beta_m) - \pi)} - 1}{e^{i(d(\beta_0 - \beta_m) - \pi)} - 1}$$

The resonant frequency is defined by the length of the QPM domains d via $$\beta_m(\omega_0) = \omega_o n_o/c - \pi/d \quad (2.22)$$

Expanding $\beta_m$ around $\omega_0$, $$\beta_m = \beta_m(\omega_0) + \beta_1 \delta\omega + \frac{1}{2}\beta_2 \delta\omega^2 \quad (2.23)$$

We examine a special case, when the group velocity of the waveguide mode matches that of the optical pulse. We will see below that such condition may be found simultaneously with quasi phase matching of the THz phase velocity. In this case $$\beta_1 = n_o/c \quad (2.24)$$

$$\beta_m(\omega) = \omega n_o/c - \pi/d + \frac{1}{2}\beta_2 \delta\omega^2 \quad (2.25)$$

Then (Eq. 2.21) becomes $$A_m = \frac{\omega}{c} \frac{\chi^{(2)} A_o(\omega) d}{\pi(n_o - \pi c/2\omega_0 d)} \frac{\varepsilon_o}{\langle \varepsilon_o^2 \rangle S} e^{i\beta_2(L-d)\delta\omega^2/4} \frac{\sin(L\beta_2 \delta\omega^2/4)}{\sin(d\beta_2 \delta\omega^2/4)}, \quad (2.26)$$

where we neglected the $\beta\omega^2$ terms in the denominator, and $L=(N+1)d$. The THz power is given by $$P_{THz}(t) = \frac{n_e}{2z_0} \frac{v}{v_{max}} \int dx dy E(r,z,t) = \frac{n_e}{2z_0} \frac{v}{v_{max}} |A(t)|^2 \langle \varepsilon_o^2 \rangle S \qquad (2.27)$$

where $v/v_{max} = (1-(\omega_c/\omega)^2)^{1/2}$ and $\omega_c$ is the cut-off frequency of the THz waveguide. Below we assume $n_e=1$. Then the THz energy produced by the optical pulse is $$W_{THz} = \qquad (2.28)$$
$$\frac{n_e}{2z_0} \frac{v}{v_{max}} \langle \varepsilon_o^2 \rangle S \int_{-\infty}^{\infty} |A(t)|^2 dt = \frac{1}{2\pi} \frac{1}{2z_0} \frac{v}{v_{max}} \langle \varepsilon_o^2 \rangle S \int_{-\infty}^{\infty} |A_m(\omega)|^2 d\omega$$

Substituting (2.26) into (2.28), we get $$W_{THz} = \frac{1}{2\pi} \frac{n_e}{2z_0} \frac{v}{v_{max}} \left( \frac{\chi^{(2)} d}{\pi c(n_o - \pi c/2\omega_0 d)} \right)^2 \frac{\varepsilon_o^2}{\langle \varepsilon_o^2 \rangle S} \int \omega^2 A_o^2(\omega) \frac{\sin^2(L\beta_2 \delta\omega^2/4)}{\sin^2(d\beta_2 \delta\omega^2/4)} d\omega \qquad (2.29)$$

The function $\sin^2(L\beta_2\delta\omega^2/4)/\sin^2(d\beta_2\delta\omega^2/4)$ has a narrow peak at $\delta\omega=0$ with the maximum value equal to $(L/d)^2$ and width—$\Delta\omega_{FWHM} \sim 2\sqrt{2\pi/L|\beta_2|}$. Therefore, the terahertz power is centered around the quasi phase-matched frequency and $$W_{THz} = \qquad (2.30)$$
$$\frac{1}{2\pi} \frac{n_e}{z_0} \frac{v}{v_{max}} \left( \frac{\chi^{(2)}}{\pi c(n_o - \pi c/2\omega_0 d)} \right)^2 \frac{\varepsilon_o^2}{\langle \varepsilon_o^2 \rangle S} \omega_0^2 A_o^2(\omega_0) L^2 \sqrt{\frac{2\pi}{L|\beta_2|}}$$

where we took into account that $\omega^2 A_o(\omega)^2$ is a relatively slow varying function, and therefore, it can be approximated by its value at the resonant frequency $\omega_0$.

For short optical pulses, $$A(\omega_0) = \int_{-\infty}^{\infty} e^{i\omega_0 t} |E_o(t)|^2 dt \approx \int_{-\infty}^{\infty} |E_o(t)|^2 dt \qquad (2.31)$$

$$A(\omega_o) \approx \frac{2z_o}{n_o} o \int_{-\infty}^{\infty} |P(t)|^2 dt = \frac{2z_o}{n_o} W_o \qquad (2.32)$$

where $W_o$ is the optical pulse energy. Then the conversion efficiency $$\eta = \frac{v}{v_{max}} \frac{8n_e}{\pi n_o^2(n_o - \pi c/2\omega_0 d)^2} \frac{\varepsilon_o^2}{\langle \varepsilon_o^2 \rangle} \frac{v_o^2 L^2}{c^2} z_o \chi^{(2)2} \frac{W_o}{S} \sqrt{\frac{2\pi}{L|\beta_2|}} \qquad (2.33)$$

The lowest mode of a rectangular guide filled with metal walls $$\beta_m = \sqrt{\left(\frac{\omega n_e}{c}\right)^2 - \left(\frac{\pi}{a}\right)^2} = \frac{\omega n_e}{c} \sqrt{1 - \left(\frac{\omega_c}{\omega}\right)^2} \qquad (2.34)$$

where $a$ is the length of the long side, $n_e$ is the efficient dielectric constant of the waveguide medium, and $\omega_c = \pi c/an_e$. Phase matching conditions (2.22) and (2.24) require that $$\sqrt{\left(\frac{\omega_0 n_e}{c}\right)^2 - \left(\frac{\pi}{a}\right)^2} = \frac{\omega_0 n_o}{c} - \frac{\pi}{d} \qquad (2.35)$$

and $$\beta_1 = \frac{d}{d\omega} \sqrt{\left(\frac{\omega_0 n_e}{c}\right)^2 - \left(\frac{\pi}{a}\right)^2} = \beta_m(\omega_0)^{-1} \frac{\omega_0 n_e^2}{c^2} = \frac{n_o}{c} \qquad (2.36)$$

respectively. Eq. (2.36) determines the value of $a$ $$a = \frac{c}{2v_0 \sqrt{n_o^2 - n_e^2}} \frac{n_o}{n_e} \qquad (2.37)$$

and $$\frac{v}{v_{max}} = \sqrt{1 - \left(\frac{\omega_c}{\omega}\right)^2} = \frac{n_e}{n_o} \qquad (2.38)$$

We note that Eqs. (2.37) and (2.38) may be satisfied only if $n_o > n_e$. The opposite relationship holds for most materials. However, the condition $n_o > n_e$ may be fulfilled in waveguides that are partially filled with a dielectric having a larger index than $n_e$.

Substituting $\beta_m(\omega_0) = \omega_0 n_e^2/n_o c$ from (2.36) into (2.35), we obtain the value of d $$d = \frac{cn_o}{2v_0(n_o^2 - n_e^2)} \qquad (2.39)$$

$$n_o - \frac{\pi c}{2\omega_0 d} == \frac{n_o^2 + n_e^2}{2n_o} \qquad (2.40)$$

Combining (2.38), (2.39) and (2.33), we get $$\eta = W_{THz}/W_o = \frac{32 n_e^2}{\pi n_o (n_o^2 + n_e^2)} \frac{\varepsilon_o^2}{\langle \varepsilon_o^2 \rangle} \frac{v_0^2 L^2}{c^2} z_0 \chi^{(2)2} \frac{W_o}{S} \sqrt{\frac{2\pi}{L|\beta_z|}} . \quad (2.41)$$

Differentiating (2.36), we obtain $$\beta_2 = \frac{1}{\beta_m c^2} - \frac{\omega}{\beta_m^2 c^2} \beta_1 \quad (2.42)$$

Recalling that $\beta_m(\omega_0) = \omega_0 n_e^2/n_o c$ and $\beta_1 = n_o/c$, we get $$\beta_2 = \frac{n_o}{2\pi v_0 c}(n_e^2 - n_o^2) \quad (2.43)$$

Conversion efficiency (2.41) now becomes $$\eta = \frac{64}{n_o (n_o^2 + n_e^2)^2 \sqrt{n_o(n_o^2 - n_e^2)}} \frac{\varepsilon_o^2}{\langle \varepsilon_o^2 \rangle} \frac{v_0^2 L^2}{c^2} z_0 \chi^{(2)2} \frac{W_o}{S} \sqrt{\frac{v_0 c}{L}} \quad (2.44)$$

Assuming a rectangular waveguide 10 with a 2:1 aspect ratio, and taking into account that the waveguide mode has the efficient area of one half of the cross section, $S = a^2/4$ and using (2.37), $$\eta = \frac{1024(n_o^2 - n_e^2)^{1/2} n_e^2}{n_o^{3.5}(n_o^2 + n_e^2)^2} \frac{\varepsilon_o^2}{\langle \varepsilon_o^2 \rangle} \frac{v_0^4 L^2}{c^4} z_0 \chi^{(2)2} W_o \sqrt{\frac{v_0 c}{L}} \quad (2.45)$$

In a numerical example we assume $n_o=2$, $n_e=1.5$, $v_0=2$ THz, $L=1$ cm and the nonlinear coefficient $\chi^{(2)}=54$ pm/V equal to that of GaSe. Then we get $\eta=0.5/\mu J$. For these conditions, we get $a=68$ μm and $d=102$ μm. It is also interesting to observe that the bandwidth of the generated THz waveform $\Delta v_{FWHM} \sim 2\sqrt{\frac{1}{2}\pi L|\beta_2|} \sim 0.2$ THz, i.e., approximately one tenth of the central frequency.

Figure 6:
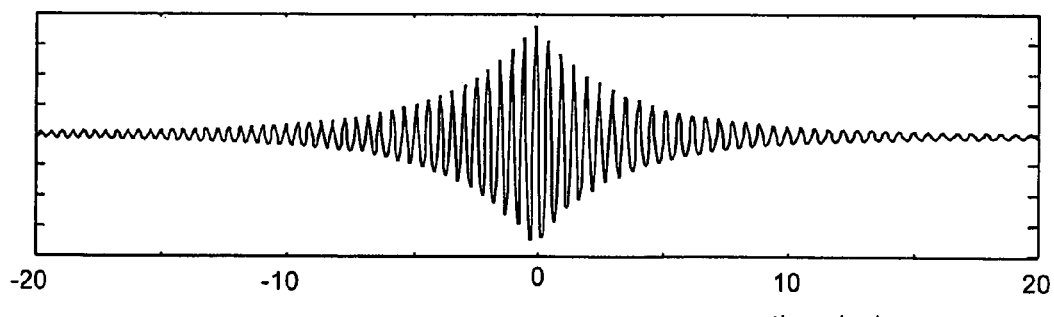
FIG. 6 is a depiction of a numerical simulation of a 2-THz waveform produced by an electromagnetic radiation source having phase and group velocity matching as described herein.

FIG. 6 depicts the temporal waveform of the terahertz wave expected to be generated in a waveguide 10 described in the above numerical example. The waveform oscillates at 2 THz and it has about 20 cycles within its full width at half maximum, which is in full agreement with the above estimate of its spectral width.

Having now described the invention in accordance with the requirements of the patent statutes, those skilled in this art will understand how to make changes and modifications to the present invention to meet their specific requirements or conditions. Such changes and modifications may be made without departing from the scope and spirit of the invention as disclosed herein.

What is claimed is:

1. An electromagnetic terahertz radiation source comprising:
    a waveguide comprising either (i) a dielectric waveguide formed from a nonlinear material or (ii) a hollow metal waveguide having an interior which is partially filled with a nonlinear material; and
    a subpicosecond laser source generating a subpicosecond pulsed lightwave, the subpicosecond laser source exciting electromagnetic terahertz radiation in the waveguide via nonlinear optical rectification of said lightwave in said waveguide, wherein phase velocity and group velocity of the lightwave are matched to phase velocity and group velocity of the excited terahertz radiation.

2. The electromagnetic radiation source of claim 1, wherein the subpicosecond laser source produces pulses having a duration between 0.1 and 0.2 picoseconds.

3. The electromagnetic radiation source of claim 1, wherein the subpicosecond laser source has a wavelength of at least 1.55 micrometers.

4. The electromagnetic radiation source of claim 1, wherein the waveguide is at least partially filled with a material transparent in a Terahertz range.

5. The electromagnetic radiation source of claim 4, wherein the material is selected from the group consisting of GaSe and $ZnGeP_2$.

6. A method generating terahertz radiation source comprising:
    providing a waveguide comprising either (i) a dielectric waveguide formed from a nonlinear material or (ii) a hollow metal waveguide having an interior which is partially filled with a nonlinear material;
    generating a subpicosecond pulsed lightwave and applying same to said waveguide, the subpicosecond pulse lightwave exciting electromagnetic terahertz radiation in the waveguide via nonlinear optical rectification of said lightwave in said waveguide; and
    matching the phase velocity and group velocity of the lightwave to phase velocity and group velocity of the excited terahertz radiation.

7. The method of claim 6 wherein the step of providing the waveguide includes:
    bonding a nonlinear dielectric material transparent in a Terahertz range to a dielectric substrate; and
    processing the nonlinear dielectric material so that the waveguide has a height and a width each less than 100 microns.

* * * * *